US006635595B2

(12) United States Patent
Kaimal et al.

(10) Patent No.: US 6,635,595 B2
(45) Date of Patent: Oct. 21, 2003

(54) PROCESS FOR SIMULTANEOUS ALKYL ESTERIFICATION OF OIL AND REGENERATION OF SPENT OIL PURIFICATION MEDIUM

(75) Inventors: Thengumpillil Narayana Balagopala Kaimal, Andhra Pradesh (IN); Penumarthy Vijayalakshmi, Andhra Pradesh (IN); Ayyagari Ananta Laxmi, Andhra Pradesh (IN); Bandi Ramalinga, Andhra Pradesh (IN)

(73) Assignee: Council of Scientific & Industrial Research, New Delhi (IN)

(*) Notice: Subject to any disclaimer, the term of this patent is extended or adjusted under 35 U.S.C. 154(b) by 258 days.

(21) Appl. No.: 09/788,560

(22) Filed: Feb. 21, 2001

(65) Prior Publication Data

US 2002/0115875 A1 Aug. 22, 2002

(51) Int. Cl.[7] .............................................. B01J 38/152
(52) U.S. Cl. ........................................................ 502/33
(58) Field of Search ............................ 502/22, 29, 31, 502/33

(56) References Cited

U.S. PATENT DOCUMENTS

| | | | | |
|---|---|---|---|---|
| 4,469,805 A | * | 9/1984 | Kofke et al. | 502/33 |
| 5,071,802 A | * | 12/1991 | Shimizu et al. | 502/38 |
| H1071 H | * | 7/1992 | Wechter et al. | 44/387 |
| 5,223,464 A | * | 6/1993 | Michaelson et al. | 502/33 |
| 5,256,613 A | | 10/1993 | Maes et al. | 502/41 |
| 5,358,915 A | | 10/1994 | Nebergall et al. | 502/27 |
| 5,468,701 A | | 11/1995 | Nebergall et al. | 502/23 |
| 5,859,268 A | * | 1/1999 | Angelici et al. | 554/126 |
| 6,174,501 B1 | * | 1/2001 | Noureddini | 422/189 |

FOREIGN PATENT DOCUMENTS

| | | |
|---|---|---|
| EP | 0529555 | 3/1993 |
| GB | 2189233 | 10/1987 |

OTHER PUBLICATIONS

R. Nebergall et al., "Commercial Spent Bleaching Earth Regeneration", *Published in INFORM*, vol. 7, No. 2 Feb. 1996, pp. 207–211.

A. Kalam et al., "Regeneration of Spent Earth in Aqueous Medium", Dept. of Chem. Tech., Univ. of Bombay, Bombay, India, *Published in JAOCS*, Vol 65, No. 12, Dec. 1985; pp. 1917–1921.

A. Kalam et al., "Regeneration of Spent Earth by Wet Oxidation", Dept. of Chem. Tech., Univ. of Bombay, Bombay, India, *Published in JAOCS*, vol. 65, No. 9, Sep. 1988, pp. 1536–1540.

H.P. Kaufmann et al., "Neuzeitliche Technologie de Fette und Fettprodukte CXVI", Institute for Industrial Fettforschung, Munster, *Published in Fette–Seifen–Anstrichmittel 69 Jahrgang*, No. 6, 1967, pp. 463–471, No month.

A. Boukerroui et al. "Regeneration of a Spent Bleaching Earth and its Reuse in the Refining of an Edible Oil", *Published in Journal of Chemical Technology and Biotechnology*, pp. 773–776, 2000 No month.

C. Waidmann et al., "De–oiling Contaminated Bleaching Clay by High–Pressure Extraction"; *Published in JAOCS*, vol. 68, No. 12, Dec. 1991, pp. 922 to 930.

K.F. Nair et al., "Surface and Pore Structure of Deoiled Acid–and–Heat–Treated Spent Bleaching Clays", *Published in JAOCS*, vol. 74, No. 8, 1997, pp. 963–970, No month.

\* cited by examiner

*Primary Examiner*—Stanley S. Silverman
*Assistant Examiner*—Edward M. Johnson
(74) *Attorney, Agent, or Firm*—Pennie & Edmonds LLP

(57) ABSTRACT

The present invention relates to a process for the simultaneous regeneration of spent clay and insitu recovery of oil from spent clay and conversion of the same to alkyl esters of $C_1$ to $C_8$ carbon atoms by treating the spent clay with alcohols at elevated temperature and pressure.

20 Claims, No Drawings

PROCESS FOR SIMULTANEOUS ALKYL ESTERIFICATION OF OIL AND REGENERATION OF SPENT OIL PURIFICATION MEDIUM

FIELD OF INVENTION

The present invention relates to a novel and simple process for the simultaneous regeneration of spent bleaching earth and conversion of adsorbed oil to alkyl esters of $C_1$ to $C_8$ carbon atoms by using alcohols. The present invention particularly relates to an improved process for the recovery of oil and its insitu conversion to methyl esters. The regenerated spent bleaching earth is further activated at 120–500° C. for 2–6 hours in a muffel furnace. The regenerated and activated earth can be reused for the bleaching of vegetable oils. The alkyl esters obtained after distillation find use as oleochemical feedstock.

BACKGROUND OF THE INVENTION

The refining of oils requires several steps to remove components that are harmful to health, or that are deleterious to storage quality. The classical steps for this purpose are de-gumming, neutralizing, bleaching and deodorizing. Bleaching with active clay is an essential step in refining of vegetable oils. The bleaching process removes undesirable substances such as soap residues, traces of heavy metals, pesticide residues and residues of phosphorus compounds etc. apart from its main purpose of removal of coloring matter like carotenoids and chlorophyll pigments. Bleaching process is carried out by using heat, hydrogen, chemical additives or by adsorption on solids. Adsorptive bleaching not only removes the coloring matter but also fulfils the other requirements of the bleaching process. Bleaching clays employed for this process are alumino silicates containing magnesium, calcium and iron in varying proportions. These clays are subjected to acid treatment, which replaces the cations by protons, thereby increasing the internal surface area and the adsorptive capacity. Bleaching of vegetable oils is carried out at a dosage of 1–3% and the current worldwide production of >60 million tons of oils is accompanied by production of spent clay containing 20–40% oil estimated at 600,000 tones. The disposal of spent bleaching clay from the vegetable oil processing industry is a problem of growing importance. Disposal of the spent earth by incineration, inclusion in animal feeds, land filling methods, or concrete etc. is generally practiced. It was a general practice to recover the fatty matter from the earth and discard the deactivated earth. The constant change in environmental legislation and the growing importance of safety in the disposal techniques has led to many restrictions in solid waste management. The earlier research on spent clay reclamation focused on the oil left in the spent clay and the clay itself was not regenerated for reuse. The recovered oil was used for industrial purposes. Recent studies are focusing not only on recovery of left over oil in the spent clay but also on regeneration of spent bleaching earth for reuse. The recovery of oil and reuse of spent bleaching earth are the areas where great opportunity exists for cost saving in the oil processing industry.

PRIOR ART DISCUSSION

There are many patented methods and published literature available on regeneration of spent earth. Different methods proposed for the recovery of oil from spent earth have been reviewed by Kaufmann and Mukharjee (Fette, Seifen, Anstrichm. 1967, 69, 463) and recovery by water separation and solvent extraction were the most commonly reported methods. Thermal regeneration of spent alumina used for bleaching of cottonseed oil was done at 400–700° C. followed by re-moisturizing the earth to ≈10%. Spent earth from the bleaching of edible oils is revived by washing with an organic solvent preferably acetone or methyl ethyl ketone. Kalam and Joshi (Journal of Am. oil Chem. Society, 1988, 65, 1917–1921) studied regeneration of deoiled spent earth in aqueous medium at a relatively lower temperature (170–270° C.) in an autoclave. They achieved about 81% regeneration (reduction in red color only). Thus, the mechanism of regeneration was explained as, desorption of adsorbate from the surface of the adsorbent, intra-particle diffusion within pores to the outer surface of the adsorbent, mass transfer from adsorbent to the liquid bulk and finally possible degradation of adsorbate in liquid bulk. Kalam and Joshi (Journal of Am. oil Chem. Society, 1988, 65, 1536–1540) also reported regeneration of de-oiled spent earth by wet oxidation method using molecular oxygen at elevated temperatures of 125–350° C. and pressure of 1–20 Mpa. in an autoclave. Thus chemical regeneration method was claimed to be clean, compact and cost effective. It proceeds via fragmentation of larger molecules into smaller molecules and finally oxidation to carbondioxide and water. Waldmann and Eggers studied de-oiling of bleaching clay by high-pressure extraction with carbondioxide as a solvent (Journal of Am. oil Chem. Society, 1991, 68, 922–930). The authors in their investigations compared the extractability of two different types of bleaching clays with carbondioxide as a solvent aiming a complete separation of the oil from the adsorbent and reuse of the later. Their results showed that oil of good quality could be recovered and the bleaching clay still has an activity of approximately 50% of fresh clay. The degree of extraction of oil for different experiments was in the range of 93 to 97%. There are many patents for the regeneration of spent bleaching earth which include an oxidation step in their process (GB Z189, 233, EP 05,29555, U.S. Pat. Nos. 5,256,613, 5,358,915, 5,468,701). Nebergall (INFORM, 1996, 7, 206–211) in his article on "Spent bleaching earth regeneration—commercial scale results" reviewed various pretreatment, extraction and post-treatment methods. He concluded that the autoclave extracted de-oiled clay produced regenerated clay far superior to that of the fresh clay. Thus all further work was done on various systems of oxidation and reactivation following an initial autoclave extraction on pilot-plant level for commercial viability. In this process due to the high temperature of processing in the autoclave, most of the adsorbed vegetable oil was converted to glycerol and free fatty acids. This step of the process recovered ≈65–70% of the organics present in the spent bleaching earth. The organics remaining on the bleaching earth i.e. chlorophyll pigments and carotenoids are burned onto the active sites by the oxidizing agent whereby they are reduced to a type of activated carbon resulting in superior performance of pilot plant regenerated clay than fresh clay. Surface—and pore—structures of de-oiled acid—and heat treated spent bleaching clays were studied after de-oiling by extraction with organic solvents (J. Am. Oil Chem. Soc., 1997, 74, 963–970). Acid and then heat treatment regenerated the de-oiled clays. Acidified heat-treated de-oiled samples had larger surface areas and greater pore volumes than fresh clay samples. Thus acid and heat treatments removed substances adsorbed in the pores that were not removed by solvents or carbondioxide extraction. A slight modification to the above process was the regeneration of spent bleaching earth first by thermal processing followed by acid treatment which resulted in the regenerated adsorbent with better properties (J. Chem. Technol. Biotechnol, 2000, 75, 773–776).

U.S. Pat. Nos. 4,469,805 and 3,472,786 disclose a process for removal of organic, polar type and nitrogen containing impurities from spent clay by percolating liquid methanol through a bed of spent clay. But in both cases, the spent clay was used to purify petroleum and not edible oil. In both cases, the oil present in the mixture was not converted into corresponding ester. However, the essential and non-obvious aspect of the present invention is the use of alcohol and the simultaneous conversion of the acids into its corresponding esters within a temperature range of 110° to 270° C. The treatment of spent clay in organic phase at high temperatures and moderate pressure results in simultaneous regeneration of clay and conversion of oils into ester. The high temperatures and efficient stirring increases the solubility of adsorbed species into the organic solvent phase resulting in desorption of adsorbates from the surface of the adsorbent. It also results in diffusion of species form within the adsorbent pores.

Thus, all the above methods involve pretreatment, regeneration, post-treatment and activation of the clay. Thus, development of a commercially viable simple process for the recovery of oil and regeneration of spent clay would be economically advantageous and also eco-friendly.

OBJECTS OF THE INVENTION

The main object of the present invention is to provide a novel process for the regeneration of the spent clay and conversion of oil recovered form the spent clay to alkyl esters.

Another object of the present invention is to provide a novel, simple and improved process for the regeneration of spent bleaching earth for reuse in bleaching of vegetable oils.

Yet another object of the present invention is to convert the recovered oil insitu to alkyl esters.

Still another object of the present invention is to use the alkyl esters thus obtained after distillation as the oleochemical feedstock.

SUMMARY OF THE INVENTION

The present invention relates to a process for the simultaneous regeneration of spent bleaching earth and conversion of adsorbed oil to alkyl esters of $C_1$ to $C_8$ carbon atoms by using alcohols. The treatment of spent bleaching earth in organic phase at high temperatures and moderate temperature regenerates the spent clay.

DETAILED DESCRIPTION OF THE INVENTION

Accordingly, the present invention relates to a novel process for simultaneous regeneration of spent clay used in refining vegetable oils and conversion of the vegetable oil recovered from the spent clay to alkyl esters of $C_1$ to $C_8$ carbon atoms, said process comprising: treating the spent clay with alcohols at a temperature in the range of 110°–270° C. for 1–11 hours.

In a preferred embodiment of the present invention, the reaction is carried out at a pressure of 10 to 50 kg/cm².

In another preferred embodiment of the present invention, the reaction is carried out at 130° to 250° C. for 4 to 11 hours at a pressure of 15 to 40 Kg/cm².

In yet another preferred embodiment of the present invention, the reaction is carried out at 170° to 230° C. for 2 to 8 hours at a pressure of 15 to 30 Kg/cm². In an embodiment of the present invention, the spent clay is a by-product obtained during bleaching of oil.

In another embodiment of the present invention, the spent clay contains 20–40% of oil.

In yet another embodiment of the present invention, the ratio of clay to alcohol varies from 1:0.5 to 1:2.5.

In still another embodiment of the present invention, the alcohols are selected from straight-chained or branch-chained alcohols.

In one more embodiment of the present invention, the alcohol is selected from $C_1$ to $C_8$ alcohols.

In one more preferred embodiment of the present invention, the alcohol is methanol and the ester obtained is methyl ester.

In one another embodiment of the present invention, the alcohol is present in excess by 10 to 30 moles.

In one another preferred embodiment of the present invention, the alcohol is present in excess by 20 moles.

In an embodiment of the present invention, the process comprises of insitu recovery and conversion of the oil to methyl esters.

In yet another embodiment of the present invention, the spent clay required minimum steps for regeneration.

In still another embodiment of the present invention, the regeneration of spent earth does not require any pretreatment or any conventionally used oxidizing agent. In one more embodiment of the present invention, the process involves thermal activation of the clay for reuse as bleaching earth.

In one another embodiment of the present invention, the regenerated spent clay is activated by heating it at 120° to 500° C. for 2 to 6 hours.

In one another preferred embodiment of the present invention, the above-reactivated earth is capable of bleaching the vegetable oils.

In another embodiment of the present invention, the bleaching of vegetable oils using above regenerated earth does not require any additional carbon.

In still another embodiment of the present invention, the yield of ester ranges from 40 to 70 per cent.

In yet another embodiment of the present invention, the process is economically advantageous, commercially viable and eco-friendly. The broad applicability of the invention was examined by reacting the spent bleaching earth with different alcohols to get different esters and regeneration of spent clay by heat treatment after removal of alcohol soluble material.

The following examples are given by way of illustration and therefore should not be construed to limit the scope of the present invention.

EXAMPLE 1

Spent earth which was used for bleaching rice bran oil (500 gm; 20% oil content; acid value 23) and methanol (500 ml) were charged to a 2 L stainless steel autoclave equipped with a stirrer, temperature control and sampling device. The contents were heated to 180° C. and the reaction was further continued at this temperature for 5 hours at a pressure of 27 kg/cm². Progress of the reaction was followed by TLC. After the reaction, the contents were cooled and the crude product was extracted with methanol. Methanol was recovered and methyl ester fraction was distilled out under vacuum. De-oiled regenerated clay was dried and activated in a muffle furnace at 150–500° C. for 2 to 6 hours and stored in a stoppered bottle.

EXAMPLE 2

Spent earth which was used for bleaching rice bran oil (500 gm; 20% oil content; acid value 23) and methanol (250 ml) were charged to a 2 L stainless steel autoclave equipped with a stirrer, temperature control and sampling device. The contents were heated to 210° C. and the reaction was further continued at this temperature for 5 hours at a pressure of 30 kg/cm$^2$. Progress of the reaction was followed by TLC. After the reaction, the contents were cooled and the crude product was extracted with methanol. Methanol was recovered and methyl ester fraction was distilled out under vacuum. De-oiled regenerated clay was dried and activated in a muffle furnace at 150–500° C. for 2 to 6 hours and stored in a stoppered bottle.

EXAMPLE 3

In this example the spent earth which was used for bleaching of sunflower oil and methanol in the ratio of 1:0.5 were charged to a 2 L stainless steel autoclave equipped with a stirrer, temperature control and sampling device. The contents were heated to 210° C. and the reaction was further continued at this temperature for 5 hours at a pressure of 30 kg/cm$^2$. Progress of the reaction was followed by TLC. After the reaction, the contents were cooled and the crude product was extracted with methanol. Methanol was recovered and methyl ester fraction was distilled out under vacuum. De-oiled regenerated clay was dried and activated in a muffle furnace at 150–500° C. for 2 to 6 hours and stored in a stoppered bottle.

EXAMPLE 4

Bleaching experiments were carried out with crude groundnut oil. The crude groundnut oil bleached with the regenerated and activated clay obtained in above examples. The oil was bleached with 3% of clay. The contents were heated to 110° C. under stirring. Bleaching earth was introduced into the bleaching vessel under vacuum. The test was carried out at 110° C. with 3% earth under pressure of 20 mm Hg for 1 hour. After the reaction, the contents were cooled and centrifuged. The supernant oil was filtered. Color of oil was measured using Lovibond Tintometer. Model PFX 990 using a 1" cell. Percentage of regeneration was calculated on the basis of reduction of red color of oil. The color of raw groundnut oil was 22 yellow and 1.0 red. The color of bleached oil was 1.6 yellow and 0.2 red. The bleaching efficiency was found to be 80%.

The main advantages of the present invention are:

(1) treatment of spent earth in organic phase at high temperatures and moderate pressure involves regeneration by thermal and solvent processes simultaneously. High temperatures and efficient stirring increases the solubility of adsorbed species into the organic solvent phase resulting in desorption of adsorbates from the surface of the adsorbent. It also results in diffusion of species from within the adsorbent pores to the outer surface of the adsorbent and then ultimately to the liquid bulk.

(2) the free fatty acids present are esterified and the glycerides are transesterified simultaneously.

(3) the regeneration of spent clay by this process does not require any pretreatment.

(4) the process for regeneration of spent clay does not require aqueous conditions or oxidizing agents.

(5) the process is economically advantageous, commercially viable and ecofriendly.

What is claimed is:

1. A process for treating a mixture of spent clay and vegetable oil to simultaneously regenerate the spent clay and to convert the vegetable oil included with the spent clay to alkyl esters, said process comprising: treating the spent clay, and the vegetable oil included therewith, with an alcohol at a temperature in the range of 110°–270° C. for 1–11 hours.

2. A process as claimed in claim 1, wherein the treating is carried out at a pressure of 10 to 50 Kg/cm$^2$.

3. A process as claimed in claim 1, wherein the treating is carried out at 130° to 250° C. for 4 to 11 hours at a pressure of 15 to 40 Kg/cm$^2$.

4. A process as claimed in claim 1, wherein the treating is carried out at 170° to 230° C. for 2 to 8 hours at a pressure of 15 to 30 Kg/cm$^2$.

5. A process as claimed in claim 1, wherein the spent clay is a by-product obtained during bleaching of oil.

6. A process as claimed in claim 1, wherein the spent clay contains 20–40% of oil.

7. A process as claimed in claim 1, wherein the clay and alcohol are present in a ratio that varies from 1:0.5 to 1:2.5.

8. A process as claimed in claim 1, wherein the alcohol is selected from the group consisting of straight-chained and branch-chained alcohols.

9. A process as claimed in claim 1, wherein the alcohol is selected from the group consisting of $C_1$ to $C_8$ alcohols.

10. A process as claimed in claim 1, wherein the alcohol is methanol and the alkyl ester obtained is methyl ester.

11. A process as claimed in claim 1, wherein excess alcohol is present in relation to the amount of vegetable oil by 10 to 30 moles.

12. A process as claimed in claim 1, wherein excess alcohol is present in relation to the amount of vegetable oil by 20 moles.

13. A process as claimed in claim 1, further comprising in situ recovery and conversion of the vegetable oil to form methyl esters.

14. A process as claimed in claim 1, wherein the spent clay required minimum steps for regeneration.

15. A process as claimed in claim 1, wherein the process does not comprise any pretreatment step, and wherein the treating step does not comprise conventionally-used oxidizing agents.

16. A process as claimed in claim 1, wherein the process further comprises thermal activation to complete regeneration of the spent clay.

17. A process as claimed in claim 16, wherein the thermal activation comprises heating the clay at 120° to 500° C. for 2 to 6 hours.

18. A process as claimed in claim 16, wherein, after treating and thermal activation, the clay is capable of bleaching vegetable oils.

19. A process as claimed in claim 1, wherein, after the treating step, the clay is capable of bleaching vegetable oils without a need for additional carbon.

20. A process as claimed in claim 1, wherein the yield of alkyl ester ranges from 40 to 70 percent.

* * * * *